(12) United States Patent
Pousti

(10) Patent No.: US 8,380,163 B2
(45) Date of Patent: *Feb. 19, 2013

(54) PACKAGE BILLING FOR MICRO-TRANSACTIONS

(75) Inventor: Michael Pousti, San Diego, CA (US)

(73) Assignee: SMS .ac, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,763

(22) Filed: Dec. 7, 2010

(65) Prior Publication Data

US 2011/0137780 A1 Jun. 9, 2011

Related U.S. Application Data

(63) Continuation of application No. 11/654,373, filed on Jan. 17, 2007, now Pat. No. 7,848,736, and a continuation of application No. 11/605,203, filed on Nov. 27, 2006, now abandoned, which is a continuation-in-part of application No. 11/516,921, filed on Sep. 6, 2006, now Pat. No. 7,826,829, said application No. 11/654,373 is a continuation of application No. 11/446,973, filed on Jun. 6, 2006.

(60) Provisional application No. 60/760,168, filed on Jan. 18, 2006, provisional application No. 60/875,751, filed on Dec. 18, 2006, provisional application No. 60/714,976, filed on Sep. 7, 2005, provisional application No. 60/687,663, filed on Jun. 6, 2005, provisional application No. 60/689,641, filed on Jun. 10, 2005.

(51) Int. Cl.
*H04M 11/00* (2006.01)
*H04W 4/00* (2009.01)

(52) U.S. Cl. ........................................ 455/406; 455/466

(58) Field of Classification Search .................. 455/406, 455/466

See application file for complete search history.

(56) References Cited

U.S. PATENT DOCUMENTS 6,690,794 B1 * 2/2004 Terao et al. ..................... 380/22
2006/0047568 A1 * 3/2006 Eisenberg et al. .............. 705/14

* cited by examiner

*Primary Examiner* — Nathan Mitchell
(74) *Attorney, Agent, or Firm* — Procopio Cory Hargreaves & Savitch LLP; Noel C. Gillespie

(57) ABSTRACT

The invention relates to a method and system for billing a mobile device user for a services and/or products requested by the user, in which a message request is received from the mobile service that is directed to the mobile device user, and wherein the mobile phone user is charged only once for a predefined amount or number of message-related services or products, thereby making the billing experience clearer to the user.

17 Claims, 9 Drawing Sheets

SMS.ac Home | Mobile Directory | Flirt | Friends | Clubs | Ring Tones

Welcome to Roger's Mobile Home Page
Roger, RogerDodger31, 421 Friends
23 years old - male - San Diego, CA. [edit]
You have 2 new friends requests smart search:

"Any existing greetings will appear right here! What do you think about that Peter, huh, character count"

Home | About | Friends | Broadcasts | Comments | Classmates | Messages | Mobile Photo Album Your Messages
Update your SMS Preferences below.

Welcome to your message Preference Page.
You can modify your preferences at any time below.

[ Check out my Mobile Homepage Now ]

SMS Preferences

| Inbox | Outbox | Manage Folders |
| SMS Preferences | Email Preferences | Community Settings |

Mobile Alerts
Update your SMS Preferences! Opt out of products and alerts, rank products, report abuse, or refer products to a friend. Select the mobile alerts below to unsubscribe.

- ☐ Drink of the day   [Rate]   [Report]
- ☐ Music Blast   [Rate]   [Report]
- ☐ Pickup Line of the Day   [Rate]   [Report]
- ☐ Technology News   [Rate]   [Report]
- ☐ Intense History!   [Rate]   [Report]

[ Update Mobile Alert Subscription ]

Mobile Friends Network    [Change Community SMS Settings]

Your personal mobile friends network, always connected!

You have requested to update your Friend Accepts notification preferences.
You have requested to update your Comments notification preferences.
You have requested to update your broadcast notification preferences.
You have requested to update your Photo notification preferences.
You have already attempted to update your Friend Requests notification preferences.
You have already attempted to update your Friend Network Reminders notification preferences.

FIG. 5a

A confirmation text message (SMS) has been sent to your mobile phone. Please reply to the confirmation to complete your request. If you do not receive the confirmation text message, please click here to contact Customer Service. Please note that the text message (SMS) may take up to 15 minutes to reach your phone.

The price per package received is $0.99.

- ☐ Notify me via SMS when friends are requesting to join my mobile friends network.* (1 msg per package)
- ☐ Remind me via SMS that friends are requesting to join my mobile friends network.* (1 msg per package)
- ☐ Notify me via SMS when join my mobile friends network.* (4 msg per package)
- ☐ Notify me via SMS when friends post a comment to my profile.* (4 msg per package)
- ☐ Notify me via SMS when friends post a broadcast to my profile.* (4 msg per package)
- ☐ Notify me via SMS when friends post a photo to my profile.* (4 msg per package)

[ Update Friends Notification Preferences ]

Rewards

Get points, bid on prizes and stay on top of it all!

The price per message received is $0.30.

- ☐ Notify me via SMS when I win an auction.*
- ☐ Notify me via SMS when I have been outbid.*
- ☐ Notify me via SMS when my auctions are ending.*
- ☐ Notify me via SMS when an auction starts.*

[ Update Rewards Notification Preferences ]

Channels

Your Channels (Please select to unsubscribe):

The price per message received is $0.30.

- ☐ channel name [Rate] [Report]
- ☐ channel name [Rate] [Report]
- ☐ channel name [Rate] [Report]
- ☐ channel name [Rate] [Report]
- ☐ channel name [Rate] [Report]

FIG. 5b

[ Update Channel Subscription Preferences ]

Clubs

You are currently in the following Clubs (Please select to unsubscribe):

The price per message received is $0.30.

Chat on any topic, anywhere in the world using your mobile phone!

- ☐ club name  [Rate]  [Report]
- ☐ club name  [Rate]  [Report]
- ☐ club name  [Rate]  [Report]
- ☐ club name  [Rate]  [Report]
- ☐ club name  [Rate]  [Report]

☐ Notify me via SMS when new members join my club.*

☐ Notify me via SMS when new clubs are created.*

[ Update Clubs and Club Notification Preferences ]

Blind Dates

Find your perfect match using your mobile phone!

The price per message received is $0.30.

○ Yes, I would like to receive Blind Dates via SMS.*

○ No, I would not like to receive Blind Dates via SMS.*

[ Update Blind Date Preferences ]

| Inbox | Outbox | Manage Folders |
| SMS Preferences | Email Preferences | Community Settings |

Service and Pricing Information

Overview

| | Sending from Web: | $0.99 per package of messages sent from web: | $0.99 per package of messages received: | Sending From Handset: | Receiving On Handset: | Frequency | How to Exit |
|---|---|---|---|---|---|---|---|
| Friends Network: | | | | | | | |
| Friends Requests & Reminders | N/A | | 1 msg per package | Carrier charges may apply | | Depends on frequency of actions by your friends. | Go to Message Preferences page from your profile to opt-out of any of these services or send STOP to 63067 |
| -Friends Accepts -Comments -Broadcasts -Mobile Photo Album | N/A | | 3 msgs per package | Carrier charges may apply | | Depends on frequency of actions by your friends. | Go to Message Preferences page from your profile to opt-out of any of these services or send STOP to 63067 |
| Web 2 Mobile | 5 Free per day* (3 msgs/package) | | N/A | Carrier charges may apply | | N/A | N/A |
| SMS.ac Application: | Sending from Web: | | | Sending From Handset: | | Frequency | How to Exit |
| Blind Date | N/A | $0.50/msg | | Carrier charges may apply | $0.50/msg received | Generally 1-2 per day, more if people like your profile | Send HIDE to 63067 |
| Mobile Alerts | N/A | | $0.25/msg received | N/A | | Usually 1 per day, but may vary | Go to www.sms.ac/channels or send END to 63067 |

Free Messages
You must have an activated mobile device to earn any additional FREE smsMessages.* Activate now!
Daily FREE Messages Package

PACKAGE BILLING FOR MICRO-TRANSACTIONS

CROSS-REFERENCE TO RELATED APPLICATIONS

This present application claims the benefit of priority as a Continuation under 35 U.S.C. §120 of U.S. patent application Ser. No. 11/654,373, filed Jan. 17, 2007, entitled "PACKAGE BILLING FOR MICRO-TRANSACTIONS," which in turn claims the benefit of U.S. Provisional Patent Application Ser. No. 60/760,168, filed Jan. 18, 2006, entitled "PACKAGE BILLING FOR MICRO-TRANSACTIONS". U.S. patent application Ser. No. 11/654,373 also claims the benefit of U.S. Provisional Patent Application Ser. No. 60/875,751, filed Dec. 18, 2006, entitled "METHOD AND SYSTEM FOR ONE-TIME OPT-IN". U.S. patent application Ser. No. 11/654,373 also claims the benefit of U.S. Non-Provisional patent application Ser. No. 11/605,203, filed Nov. 27, 2006, entitled "SYSTEM AND METHOD FOR VERIFICATION OF IDENTITY FOR TRANSACTIONS," which is a continuation-in-part of U.S. Non-Provisional patent application Ser. No. 11/516,921, filed Sep. 6, 2006, entitled "AUTOMATED BILLING AND DISTRIBUTION PLATFORM FOR APPLICATION PROVIDERS", which claims priority to U.S. Provisional Patent Application Ser. No. 60/714,976, filed Sep. 7, 2005, entitled "AUTOMATED BILLING AND DISTRIBUTION PLATFORM FOR APPLICATION PROVIDERS". U.S. patent application Ser. No. 11/654,373 further claims benefit of priority to U.S. Non-Provisional patent application Ser. No. 11/446,973, filed Jun. 6, 2006, entitled "BILLING SYSTEM AND METHOD FOR MICRO-TRANSACTIONS", which claims benefit of priority under 35 U.S.C. §119 from U.S. Provisional Patent Application Ser. No. 60/687,663, filed Jun. 6, 2005, entitled "METHOD AND SYSTEM BY WHICH MICRO TRANSACTIONS ARE PROCESSED," and U.S. Provisional Patent Application Ser. No. 60/689,641, filed Jun. 10, 2005, entitled "METHOD AND SYSTEM BY WHICH MICRO PAYMENT TRANSACTIONS OCCUR VIA A WIRELESS DEVICE AND/OR INTERNET PORTAL." All of the prior applications are incorporated herein by reference in their entireties for all purposes.

FIELD OF THE INVENTION

The present invention relates to a billing mechanism for supporting micro-transactions for services, applications and other products for mobile phone users.

BACKGROUND

Currently, cellular telephone carriers (or mobile phone carriers—the terms are used interchangeably throughout this specification) routinely bill users for small transactional amounts and are able to do so while making a profit. These transactions are referred to as micro-transactions and, in terms of U.S. currency, can be as small as a few pennies (additionally, larger transactions occur as well). Retailers or vendors may desire to provide their respective content or services to mobile phone users via the web or directly through the user's mobile phone, and bill for such content or services as micro-transactions. Currently, a retailer or vendor will find it very difficult to take advantage of this opportunity for micro-transaction billing for their content or services accessed by a mobile phone user because doing so would require the retailer/vendor to personally negotiate and reach a contractual agreement with the particular cellular carrier to which the mobile phone user is subscribed. The process is further complicated by the fact that not all consumers use the same cellular carrier and, therefore, the retailer/vendor would need to contract with hundreds of different cellular carriers around the globe to be able to have this billing option available to the desired global market of mobile phone users.

Certain of the above-referenced applications, U.S. Provisional Patent Application No. 60/714,978, U.S. Provisional Patent Application No. 60/689,641, and U.S. Provisional Patent Application No. 60/687,663, describe in part various aspects of methods for allowing retailers to easily conduct transactions, many of which may be micro-transactions, with the global market of mobile phone users, and for managing and processing such micro-transactions.

In one aspect of the methods and systems described in the above-mentioned applications, a mobile phone user accesses products and services through a platform which is independent from the carrier service of the mobile phone user, and the user is billed for a service by having the platform send a premium message to the mobile phone user to provide the service/product requested. In this manner, the mobile phone user receives a charge for each message sent to the mobile phone user that is associated with the desired service and/or product. For example, if the user requests a service through the platform for receiving text messages when a certain event occurs, such as a stock market event, then the user is charged when each message is sent to the user, thereby resulting in multiple entries on the user's carrier bill.

In the alternative to a charge for each message received by the user, it may be preferable to have a mechanism whereby the mobile phone user can be charged only once for a predefined amount of message-related service/product, thereby making the billing experience clearer to the user.

SUMMARY

One aspect of the present invention relates to a method and system for billing a mobile device user for services and/or goods requested by the user, in which a message request is received from the mobile service that is directed to the mobile device user, and wherein the mobile phone user is charged only once for a predefined amount or number of message-related services or products, thereby making the billing experience clearer to the user. Another aspect of the present invention relates to a method and system for billing a mobile device user for a mobile service requested by the user, in which a message request is received from the mobile service that is directed to the mobile device user, and it is determined if the mobile service utilizes a predefined package of premium messages and standard messages corresponding to a package price. If the mobile service utilizes a predefined package of premium messages and standard messages corresponding to a package price, the received message request is processed by determining if the received message is the first message of the predefined package to be sent to the user and sending to the user, in the event that the received message is the first message of the predefined package, a premium message containing a price code that represents the package price. In the event that the received message is not the first message of the predefined package, a standard message which does not contain a price code is sent to the user. In the event that the mobile service does not utilize a predefined package of premium messages and standard messages corresponding to a package price, the received message request is processed by sending to the user a premium message containing a price code that represents a single-message price which is different than the package price.

In this manner, a predefined package of messages can be used by the mobile phone user for a requested service/product, and the mobile phone user can be charged only once for the predefined package of message-related service/product thereby making the billing experience clearer to the user.

It is understood that other embodiments of the present invention will become readily apparent to those skilled in the art from the following detailed description, wherein is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive

BRIEF DESCRIPTION OF THE DRAWINGS

FIG. 5a-5c is a schematic of a web page that is accessed by a user to request a product or service that utilizes a package billing system, according to one embodiment of the present invention.

FIG. 6 is a schematic of a web page that is accessed by a user to explain products and/or services available for request by the user, some of which utilize a package billing system, according to one embodiment of the present invention.

DETAILED DESCRIPTION

Figure 1:
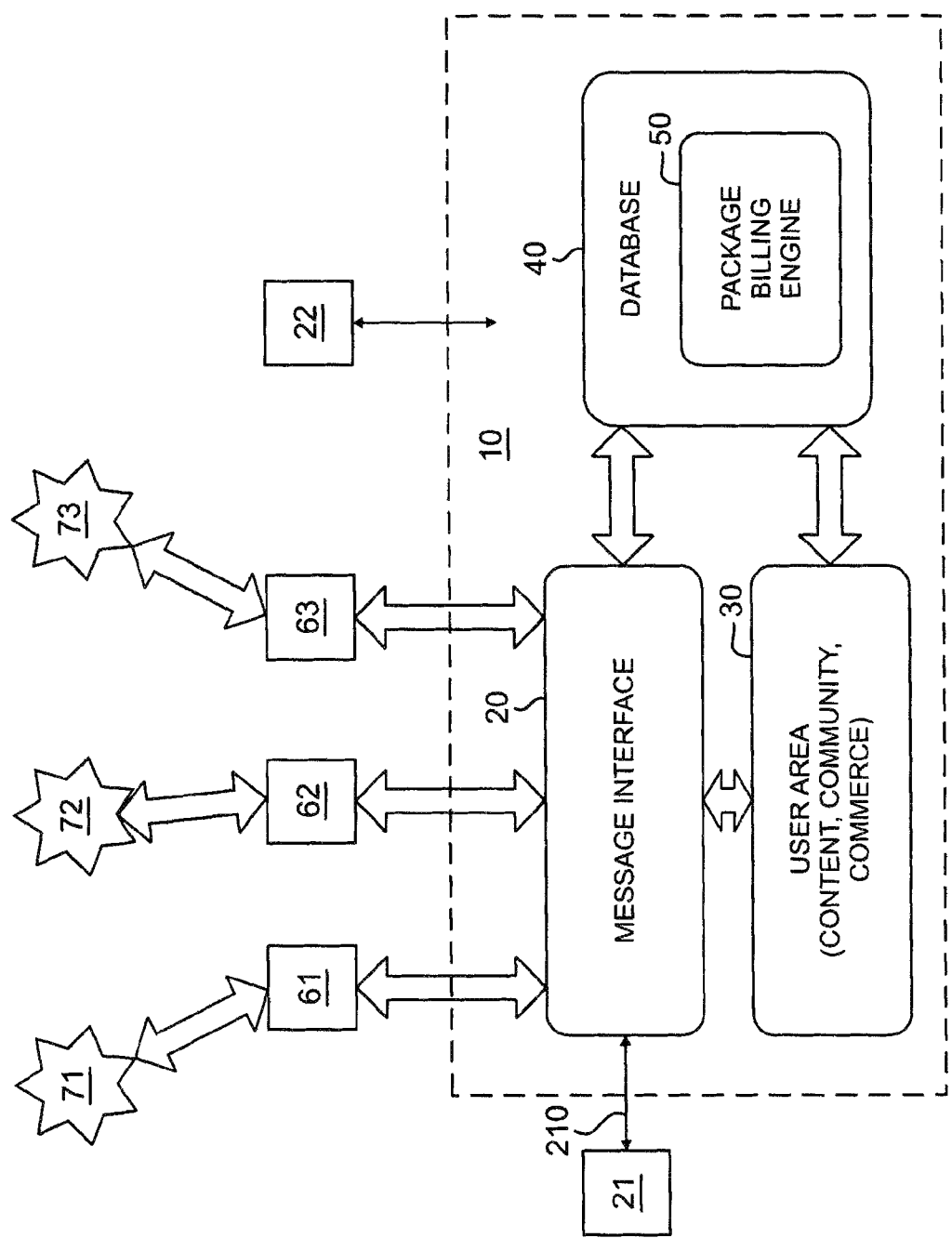
FIG. 1 is a block diagram of a computer-based mobile community platform, according to one embodiment of the present invention.

FIG. 1 depicts a block diagram of a computer-based mobile community 10. Users (such as user 21) can connect to the mobile community 10 via a network or similar communications channel 210. Via the connection, a user may create a profile page or "home page" that they can personalize. This profile page can include various files and content that the user wants to share with other members of the mobile community 10.

Additionally, this mobile community connects with various cellular carrier systems 61, 62, 63, each of which has an associated community of mobile phone subscribers, 71, 72, 73. Users (such as user 21) of the mobile community 10 are also subscribers of the various cellular carriers. In this way, users of the mobile community 10 not only have access through the computer-based platform 10 to other users' profile pages, they also have easy access to subscribers of the various cellular carrier systems 61, 62, 63.

A benefit of the architecture depicted in FIG. 1, is that the mobile community platform 10 has already contracted for services with the cellular carrier systems 61, 62, 63. As is known in the art, the cellular carrier systems 61, 62, 63 provide messaging and premium message functionality. Premium messages are sent via the cellular carrier's infrastructure to mobile subscribers and, internal to the cellular carrier's infrastructure, generates a billing event according to a particular tariff rate. In practice, when the mobile community 10 sends a message via a cellular carrier system (e.g., 61), the same is billing the recipient of the message using the existing billing system of that cellular carrier. The billing event is often referred to as a micro-transaction. Thus, a user (e.g., 21) of the mobile community 10 may conduct transactions with a vendor/retailer/service provider 22 via the mobile community 10 and may be billed for those transactions via their cellular service account. The vendor/retailer/service provider 22 in the transaction need only communicate with the mobile community 10 regarding the transaction and does not require any affiliation or agreement with any cellular carrier. The vendor/retailer/service provider 22 in the transaction may be a single user, a large company, or anyone or anything in between that has a product or service to sell.

As further seen in FIG. 1, mobile community 10 can be used to conduct a micro-transaction in which a cellular carrier's billing system is used by the mobile community 10 platform to automatically bill the user for each micro-transaction with a vendor/retailer/service provider 22, without the need for a negotiation or contract between the vendor and the cellular carrier. One example of this feature is that of software content distribution where software developers can offer software products to the users of the mobile community 10 while taking advantage of the billing arrangements already in place between the mobile community 10 and the cellular carriers 61, 62, 63. Of course, a software application may provide any other type of content or service to users of mobile community 10, such as stock market reporting via text messages.

As shown in FIG. 1, some of the sub-components of the mobile community platform 10 are a message interface 20, user area 30 where the content, community and commerce functions are accessed by and handled for the users, and a database 40 with package billing engine 50 implemented therein. The details of these different sub-components are more fully explained throughout the remainder of this detailed description.

As noted earlier, users, such as user 21, can visit the user area 30 to participate in an on-line community that includes various content and commerce opportunities. This is typically accomplished via a user's web browser that may be hosted on a laptop or desktop computer, or, in the alternative, even on the user's mobile device such as a PDA or mobile phone. Thus, the user area 30 includes a web server that communicates with users and interfaces with database 40 which includes a data store of user information and other content. With these resources, the mobile community 10 is able to present to a user a profile page ("home page") that reflects content and information associated with, and desired by, that particular user. This content and information is not maintained on the local computer being used by the user but, rather, is maintained and managed by the computer systems within mobile community platform 10.

Figure 3:
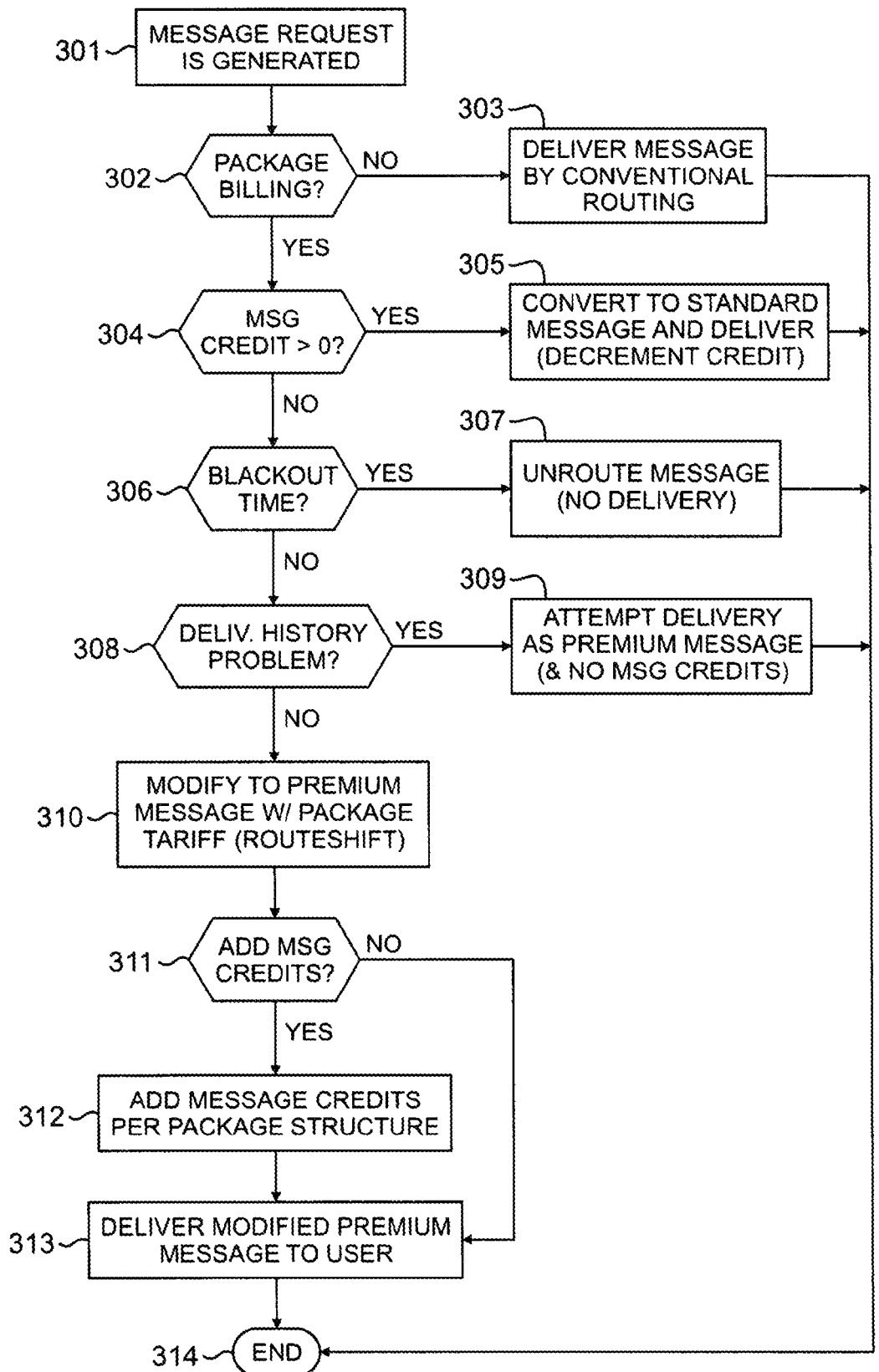
FIG. 3 is a flowchart depicting the steps executed to implement the package billing system, according to one embodiment of the present invention.

Although not explicitly depicted in FIG. 3, one of ordinary skill will recognize that there are numerous functionally equivalent techniques to create, manage, store and serve user information, user profiles, user content, software tools and other resources within the user area 30. Included in these techniques are methods to ensure security, data integrity, data availability and quality of service metrics.

The message interface unit 20 includes applications for connecting with and communicating with the multiple different cellular carriers 61, 62, 63 that have been partnered with the platform of mobile community 10. The message interface unit 20 is configured to generate message requests in the appropriate format for each of the cellular carriers 61, 62, 63 including tariff information that determines the amount for which the recipient of the message will be charged. Upon receipt of the message request, the cellular carriers 61, 62, 63 will use the information in the request (known as a "short code") to generate an appropriate message to the intended recipient/subscriber of the cellular carrier and then bill the recipient/subscriber's cellular service account for the specified amount.

The message interface unit 20 communicates with the user area 30, such that users of the mobile community 10 can advantageously use the connectivity of the message interface unit 20 with the carriers in order to send messages to subscribers of any of the cellular carriers 61, 62 63. The messages may be SMS messages, MMS messages, or other message formats that are subsequently developed. Some of these messages may have zero tariff and, therefore do not generate a bill (other than the underlying charges implemented by the cellular carrier) and others may have non-zero tariffs resulting in a billing event for the recipient.

As mentioned above, database 40 includes information corresponding to each user of mobile community 10, and includes data corresponding to the services and applications requested by that user, and also includes a message credit balance that corresponds to a number of remaining standard messages that are allowed to the user according to a predefined package of premium messages and standard messages that the user has requested. These aspects will be explained in more detail below.

Figure 2A:
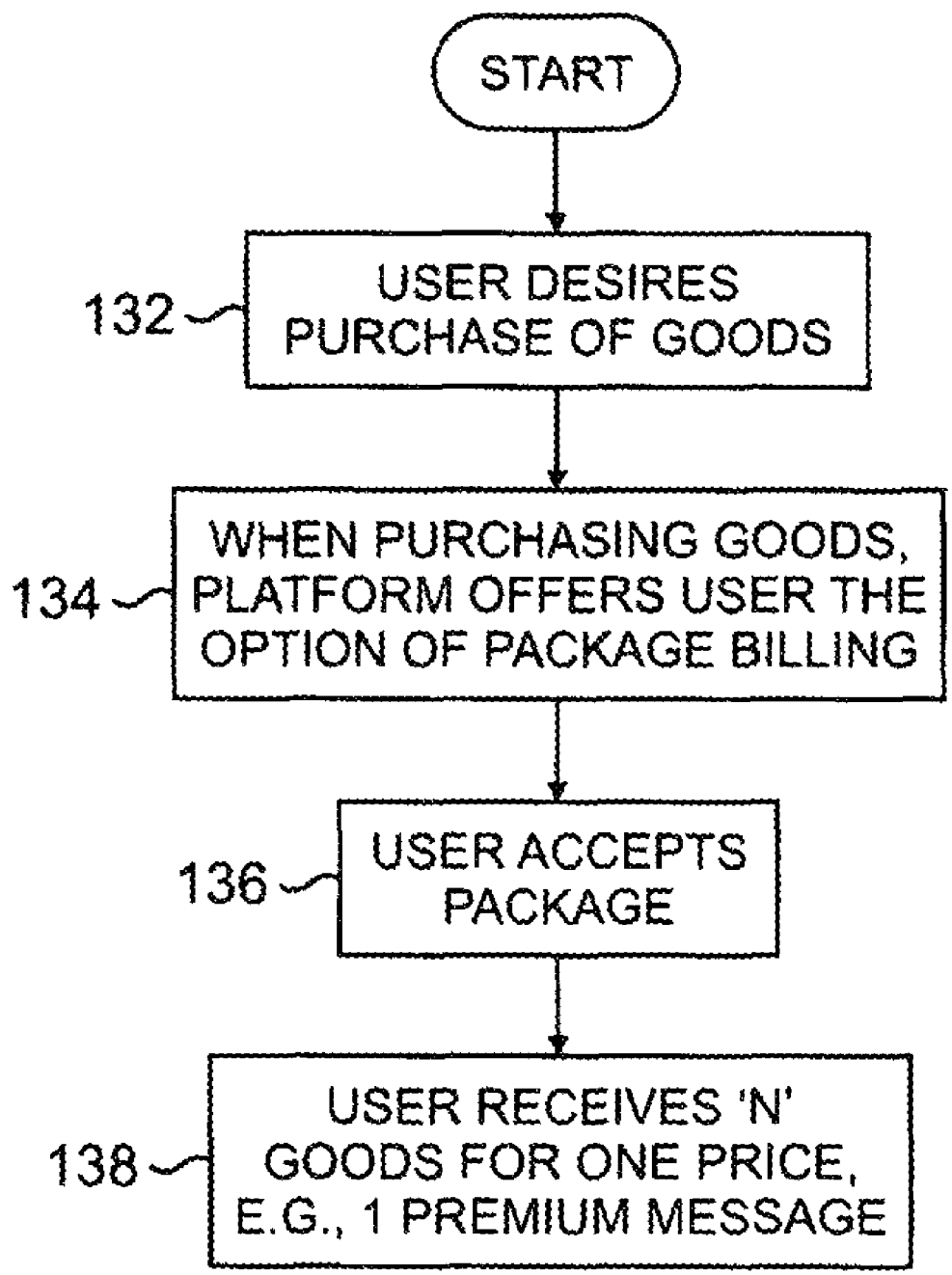
FIG. 2a is a flowchart showing a method according to one embodiment of the present invention.
Figure 2B:
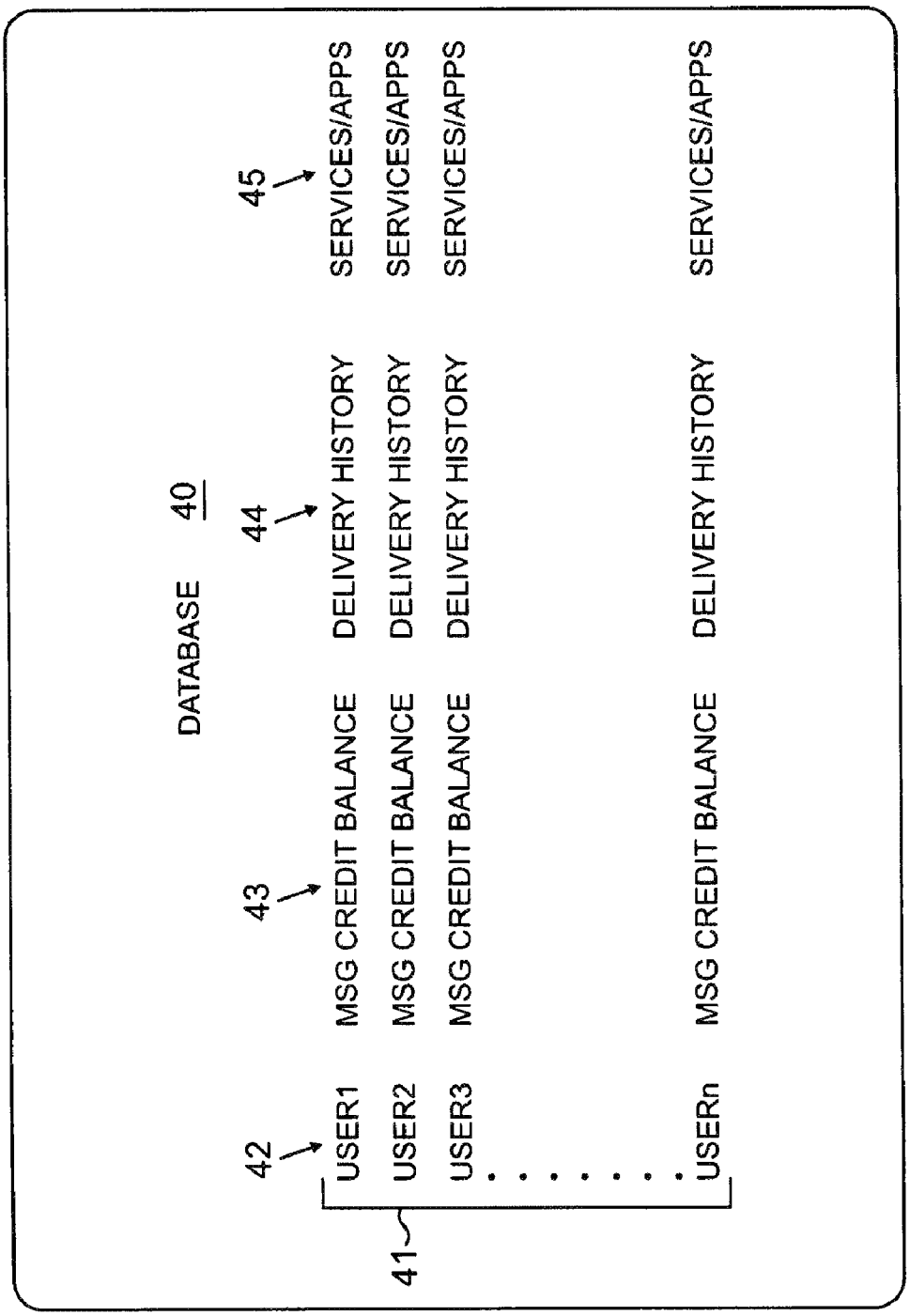
FIG. 2b is a block diagram of the database shown in the computer-based mobile community platform 10 of FIG. 1.

FIGS. 2a and 2b are, respectively, a method for package billing according to an embodiment of the invention and a depiction of database 40, although it should be appreciated that other embodiments of databases or data stores can be used to implement the present invention.

Referring to FIG. 2a, a user may desire to receive goods from a vendor connected in some way to the mobile platform (step 132). When purchasing a good, which may be an item of information as well as a physical good, the user may be offered the option for package billing (step 134). The user may accept the package billing option (step 136), and then the user receives the goods (step 138). As an example, a user may click on "BUY SONG", and the platform may respond by offering the user the option to buy multiple songs, e.g., five songs, for one price, e.g., $1.00. Or the option may be given to receive 100 messages for $5.00, e.g., message relating to stock price fluctuations. In any case, in certain embodiments, the charge may be recurring, e.g., on a monthly, weekly, or yearly basis. That is, the user may, on a monthly cycle starting from the date the user signed up for package billing, be billed on a regular periodic basis for the same number of messages.

To accomplish the steps above, an exemplary "back end" of the system is shown in FIG. 2b. As seen there, database 40 includes a series of data records 41 corresponding to various users of mobile community 10. In each record is data corresponding to a particular user. In this regard, the data records 41 include a message credit balance 43 corresponding to a product or service that the user has requested which utilizes package billing according to the present invention. For example, a service requested by the user may implement package billing in which the user is allowed four messages for a predefined package price, such as $1.00. In such a case, the present invention implements the package billing by sending the first message as a premium message in which the user is charged $1.00, and then allowing the next three messages to be sent to the user as standard messages for no charge. In this way, the user is only charged once per package of service requested by the user. The message credit balance 43 indicates how many remaining standard messages the user is allowed under the predefined package of messages. For example, if message credit balance 43 has a value of 3, then the user has already been charged for the package and is allowed the next 3 messages for no additional charge. When the user has used all messages allowed by the predefined package, the message credit balance 43 has a value of 0, indicating that the next message provided by the service requested by the user will be the start of a new package of messages and will result in the billing of an additional package price when the first of the next package of messages is sent to the user.

As seen in FIG. 2b, database 40 also includes delivery history 44 in data records 41 which indicates whether the previous attempts to deliver messages to the user have been successful. In this way, there is an indication that the user may have been disconnected by the user's carrier, or that the user has terminated service with the user's carrier. In either case, there is a financial risk in allowing further messages to be sent to the user, since the messages are costly to the operator of mobile community 10. Lastly, records 41 also include services/apps data 45 to indicate which services and/or applications the user has requested and when those services and/or applications were requested by the user. In the alternative, this information can be maintained in a separate database or lookup table.

FIG. 3 is a more detailed flowchart depicting the steps for implementing the package billing system according to one embodiment of the present invention. The steps of FIG. 3 are implemented by package billing engine 50. As seen in FIG. 3, a message request is generated in step 301 and is received by package billing engine 50, the message request being directed to a user of mobile community 10. For example, a service that was requested by the user may generate a message to the user, such as an indication that a particular stock has reached a predefined limit, in the case of a stock price reporting service that the user has requested.

Next, in step 303, it is determined whether the generated message request is associated with a predefined package pricing model. In this regard, the records of database 40 are accessed and the services/apps 45 data for the corresponding user is accessed to determine if the user has requested the service associated with a package pricing model. In one scenario, this may depend on the date that the user requested the particular service, whereby all services requested after a particular date are billed according to a package pricing model instead of a charge-per-message model. If it is determined that the generated message request is associated with a predefined package pricing model, then flow passes to step 304. If the message request is not associated with a predefined package pricing model, then flow passes to step 303 in which the message is delivered according to a routing method in which the user is not billed according to a package pricing model, such as a charge-per-message model, and flow then passes to the end of processing in step 314.

In step 304, it is determined if the user to whom the message is addressed has a message credit balance greater than zero. If the user does have a message credit balance greater than zero, then the user has already been charged for the predefined package of messages, and is still allowed the remaining balance of messages that the user will not be charged for. If the user does not have a message credit balance of greater than zero, then this indicates that the generated message is the first message in a new package of messages and the flow passes to step 306. If the user does have a message credit balance of greater than zero, then flow passes to step 305 and the message is converted to a standard message that does not contain a tariff code (or premium short code) and the standard message is then delivered to the user via message interface unit 20, and the user's message credit balance is decremented by one, and flow then passes to the end of processing in step 314.

In step 306, it is determined whether the user is currently in a blackout time period, in which the user's carrier does not allow the type of generated message, such as from a commercial service, to be delivered to the user. The blackout times can be determined from services/apps data 45 in database 40. If the user is currently in a blackout time period, then flow passes to step 307 and the generated message is derouted and is thereby not delivered to the user, and flow then passes to the end of processing in step 314. Otherwise, if the user is currently in a blackout time period, then flow passes to step 308 in which it is determined whether the user has a delivery history problem, so as to avoid sending messages free of charge to the user if the user no longer has service with the user's respective carrier. In this regard, the delivery history 44 for the user is accessed from database 40, and if a previous predefined number of delivery attempts have been unsuccessful, then there is a problem and flow passes to step 309 in which the message is attempted to be delivered to the user, but as a premium message, and the user's message credit balance is set to zero so as not to allow further standard messages to be sent with no charge until successful delivery to the user is achieved, and flow then passes to the end of processing in step 314. For example, if the past five messages have not been successfully delivered to the user, then the user will not receive any more messages until a premium (tariff) message has been successfully delivered to the user. The delivery history 44 is determined by a handset delivery receipt that is provided to mobile community platform 10 by the user's carrier when a message sent from mobile community platform 10 is successfully delivered to the user.

If it is determined in step 308 that the user does not have a delivery history problem, then flow passes to step 310 in which the generated message is modified (route-shifted) to a premium message containing a tariff (short code) that corresponds to the predefined package price related to the service package that the user has requested. Flow then passes to step 311 in which it is determined if the user is entitled to have the corresponding message credit balance 43 updated to reflect that the user is entitled to additional subsequent free messages according to the particular service that the user has requested. For example, if the user requested a package that only allows one message for the package price, then the user is not allowed more messages. However, if the user has requested a package that allows for three additional messages after the first message is sent, then the user's message credit balance 43 is updated in step 312 to a value of 3, and flow then passes to step 313.

If the message credits are not to be added to the user's message credit balance 43, then flow passes directly to step 313 and the modified premium message is delivered to the user via message interface unit 20. Flow then passes to the end of processing in step 314.

At least portions of the invention are intended to be implemented on or over a computer-based network such as the Internet. An example of such a network is described in FIG. 4. The description of the network and computer-based platforms that follows is exemplary. However, it should be clearly understood that the present invention may be practiced without the specific details described herein. Well-known structures and devices are shown in block diagram form in order to avoid unnecessarily obscuring the present invention.

Figure 4:
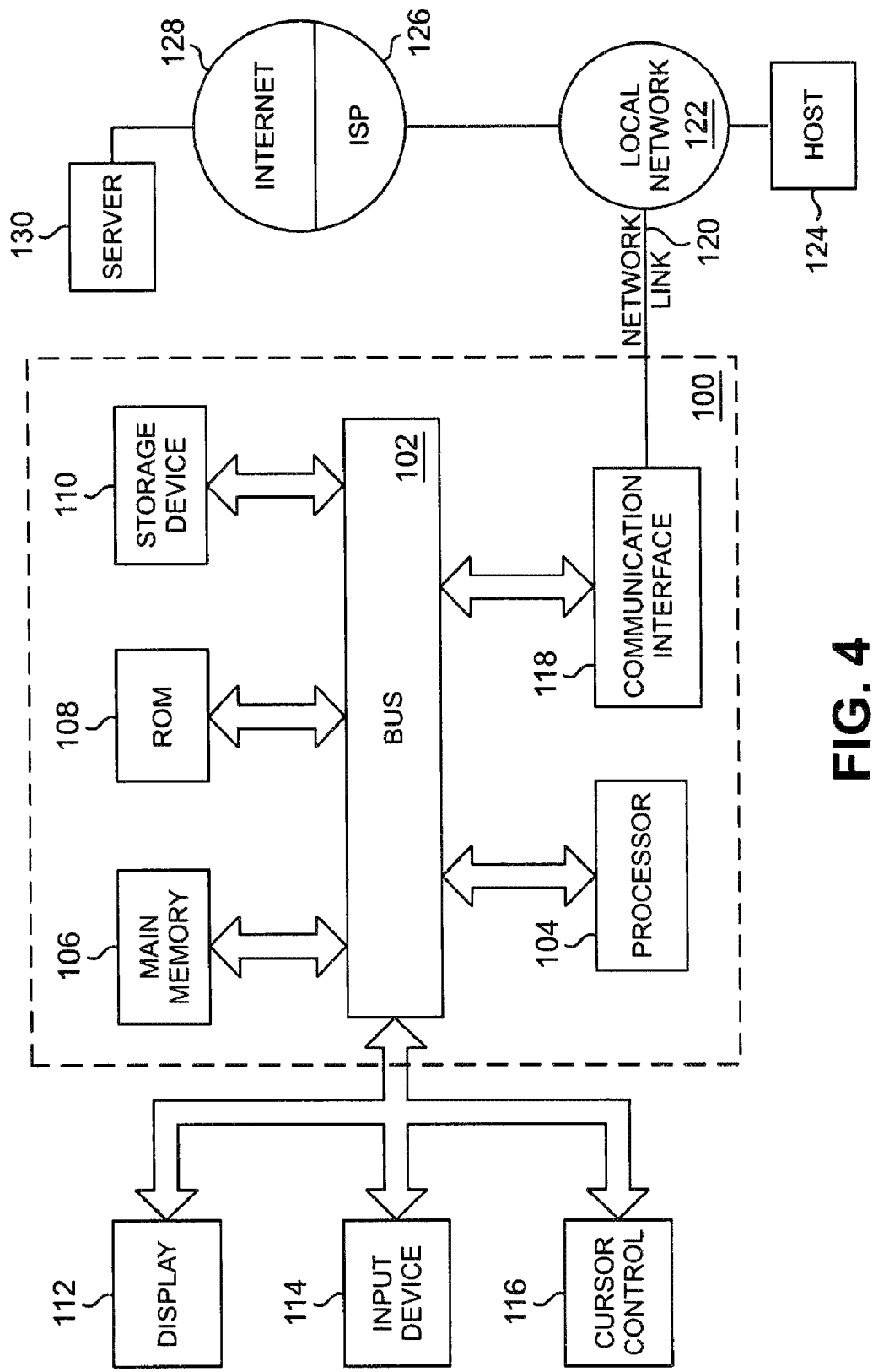
FIG. 4 is a block diagram of a computer-based system for implementing the package billing system, according to one embodiment of the present invention.

FIG. 4 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry, firmware and micro-code may be used in place of or in combination with software instructions to implement the invention. Thus, embodiments of the invention are not limited to any specific combination of hardware circuitry and software, or firmware, for that matter.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented, such as those implemented via cellular or wireless networks, Bluetooth systems, optical systems, and other forms of wireless communications. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

FIGS. 5a-5c is a depiction of a user-interface web page though which the user can request various services and products, some of which are billed on a "price per package" model, and some of which are billed on a "price per message" model. As mentioned above, those services that are billed on a package price include a description in the web page of FIGS. 5a-5c as to the number of messages allowed to the user for that service in return for the predefined package price.

FIG. 6 is a depiction of a user-interface web page which further provides "Service and Pricing Information" to the user and provides more detail as to the whether the service is billed on a "price per package" model or on a "price per message" model. The web page of FIG. 6 further describes the number of messages allowed per package for package-based services, and the associated package price.

In view of the above, the present invention provides the ability to change billing models in real time as outgoing messages are processed by mobile community platform 10. In addition, the processing of the present invention is (1) capable of very high transaction rates; (2) capable of running in parallel for increasing the transaction rate; (3) able to detect the state of the message recipient across several logical boundaries; (4) able to apply the detected message recipient state to determine the recipient's ability to receive the message; and (5) able to apply the detected message recipient state to determine the recipient's current messaging balance and then (a) if the messaging balance is zero, then generate a new billing (premium) message to create a new balance for the recipient, or generate a new billing message that is self-paying; (b) if the messaging balance is greater than zero, then re-route the message from a premium route (tariff) to a standard route (no charge to user); (c) if the messaging balance is zero, then route-shift the message from a lower tariff route to a higher tariff route to reflect the package price; (d) check the recipient's delivery history and use that data to determine how to continue to send messages to the recipient e.g., no standard messages until a premium message is successfully delivered; and (e) unroute a message if the recipient is currently in a blackout time period.

Various alternative implementations of portions of embodiments of the invention are now noted. First, the mobile community platform refers to a network in which each user has a handset or other wireless device with embedded software which interfaces with software that may be embedded in a web site, a cash register, a television (e.g., to allow viewer voting contexts within television programming), or other product-dispensing devices, e.g., vending machines. The mobile community platform need not specifically be a web site: it can be software connected to a point of sale device. The mobile community platform can exist as a feature of common electronic devices or via a connected device such as a cash register or a broadband two-way device such as a television. In this way, the handset or other wireless device acts as a remote control enabling the user to conduct a variety of functions. The user is, thus, enabled to utilize an easy-to-use and highly portable medium, namely, the sending of text messages, to conduct a variety of transactions. One skilled in the art can envision future technologies replacing text messages to effectuate such transactions. The mobile wireless device is a device the user possesses, but other devices serving as a remote control can also be employed, including a television, a cash register in a store, and so on. In particular, the mobile device, acting as a "remote control" can interface with the software on a web site, cash register, television, vending machine or with any other device selling products, thus functioning much like a point of sale terminal with the added advantage of being mobile. Physicians may view scans or case reports on a mobile device, with the payment or reimbursement occurring via the transaction system above.

The system can employ software on a network, such as the Internet, interacting with a product via a browser or other type of world wide web. One embodiment utilizes a WAP link, a WAP site or a mobile web site. In the case of a mobile web site, messages may be retained on the handset, allowing the same to be utilized as a constant reference similar to a benchmark. Another possibility is to have handset applications with "on deck" software installed that recreates the mobile community network product experience, functioning similar to other familiar application experiences on the handset, from a software perspective, but also enabling data transfers from the web. The software may be similar to an email client installed on a machine, but once opened up to access emails originating from another source, allowing access to the mobile community network and accompanying mobile community network applications through the installed software. Another embodiment includes enablement of interaction with hardware such as in the case of a consumer's physical interaction with the device. This interaction may occur through a single button imbedded on a device which when clicked will access the community for the user.

Added levels of protection may be provided by requiring the user to identify a personally identifiable number, e.g., a mobile PIN, that has been assigned to that user, much like an ATM PIN number. By way of example only, by entering the mobile PIN, the handset can be used like a keypad and can achieve the functionality equivalent to a "portable ATM". Once a key on the handset is pressed, the user accesses an interface (which may be just the handset's native messaging functionality, a user interface associated with the mobile community platform, or indeed any other way of sending a signal) and is then queried as to what they desire to do. The user can respond with the selection such as to send cash, as an example. The user is then asked to enter the mobile PIN. The platform confirms and executes the user's requested transaction. By pressing a button on the wireless device, the user has achieved the same transaction as walking to a bank or to an ATM. Other types of protection can also be provided, e.g., by text-messaging, etc. Additional details of such implementations may be found in U.S. Provisional Patent Application No. 60/854,022, filed Oct. 23, 2006, entitled "Content Owner Verification, Digital Rights Management For Automated Distribution and Billing Platforms", owned by the assignee of the present invention and which is hereby incorporated by reference in its entirety for all purposes.

The above description is provided to enable any person skilled in the art to practice the various embodiments described herein. Various modifications to these embodiments will be readily apparent to those skilled in the art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more". All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for billing a user for a service, application, content, information, product, or some combination thereof (services) requested by the user, the method comprising the steps of:
   allowing the user to create a personalized area within an online community;
   making the services available to the user through the personalized area within the online community;
   receiving a request from the user for the services;
   determining if package billing is associated with the requested services;
   processing, in the event that package billing is associated with the requested services, the received request by
   determining if the received request is the first request associated with the requested services,
   causing, in the event that the received request is the first request associated with the requested services, a premium message containing a price code that represents a package price to be sent to the user, and
   maintaining a credit balance associated with the requested services; and
   determining if a subsequent received request is associated with the requested services and decrementing the credit balance when it is determined that the subsequent request is associated with the requested services.

2. The method of claim 1, wherein the requested services correspond to audio or video or photographic or audiovisual files.

3. The method of claim 2, wherein the requested services correspond to songs.

4. The method of claim 2, wherein requested services correspond to videos.

5. The method of claim 1, wherein the requested services correspond to at least one of: stock prices, weather data, horoscope data, blogs, "how to" content, applications, data corresponding to Beauty, Health and Wellness, Dating and Relationships, Developer Tools, Education and Reference, Entertainment, Finance, Flash Applications, Flash Games, Flash Movies, Games, Inspirational, Maps, Directions and Travel, Miscellaneous, Mobile Blogs, News, Weather, Shopping, Sports, Ringtones and combinations of the above.

6. The method of claim 1, wherein the package billing provides a predetermined amount of content associated with the requested services to be received by the user over a predefined time period.

7. The method of claim 6, wherein the package billing is renewed periodically.

8. The method of claim 7, wherein the period is selected from the group consisting of: monthly, weekly, and yearly.

9. The method of claim 7, wherein the package billing is renewed periodically by sending a premium message to the user.

10. A system for billing a user for a service, application, content, information, product, or some combination thereof (services) requested by the user, the system comprising:
   at least one hardware processor;
   a user area of an on-line community configured to provide access to a plurality of services to a plurality of users;
   a database unit in communication with the user area, the database unit containing price data corresponding to the services requested by the user and indicating whether the services are associated with package billing, and also containing credit balance data; and
   a billing engine configured to operate in conjunction with the database and to, when executed by the at least one hardware processor,
   receive information related to a request for the services by the user,
   determine if package billing is associated with the requested services,
   determine if the received request is the first associated with the requested services when it is determined that package billing is associated with the requested services,
   send a premium message containing a price code that represents a package price to the user when it is determined that the received request is the first request associated with the requested services,
   maintain a credit balance associated with the requested services, and determine if a subsequent received request is associated with the requested services and decrement the credit balance when it is determined that the subsequent request is associated with the requested services.

11. The system of claim 10, wherein the requested services correspond to audio or video or photographic or audiovisual files.

12. The system of claim 10, wherein the requested services correspond to songs.

13. The system of claim 10, wherein the requested services correspond to videos.

14. The system of claim 10, wherein the requested services correspond to at least one of: stock prices, weather data, horoscope data, blogs, "how to" content, applications, data corresponding to Beauty, Health and Wellness, Dating and Relationships, Developer Tools, Education and Reference, Entertainment, Finance, Flash Applications, Flash Games, Flash Movies, Games, Inspirational, Maps, Directions and Travel, Miscellaneous, Mobile Blogs, News, Weather, Shopping, Sports, Ringtones and combinations of the above.

15. The system of claim 10, further comprising a message interface unit in communication with an external billing mechanism or mechanisms.

16. The system of claim 15, wherein the message interface is further configured to receive information related to the requested services that includes billing information including any packaged billing information and to send a message to the external billing mechanism including the billing information.

17. The system of claim 15, wherein the message interface unit is in communication with multiple mobile phone carriers and the user area; and wherein at least some of the external billing mechanisms are the mobile phone carriers' billing mechanisms.

* * * * *